US006981767B2

(12) United States Patent
Schmitt et al.

(10) Patent No.: US 6,981,767 B2
(45) Date of Patent: Jan. 3, 2006

(54) PRINTED ITEM HAVING AN IMAGE WITH A HIGH DURABILITY AND/OR RESOLUTION

(75) Inventors: Stephen E. Schmitt, Winnetka, IL (US); Chris Peterson, Westmont, IL (US); Mark Rosland, Westmont, IL (US)

(73) Assignee: SSGII, Inc., Northbrook, IL (US)

( * ) Notice: Subject to any disclaimer, the term of this patent is extended or adjusted under 35 U.S.C. 154(b) by 164 days.

(21) Appl. No.: 10/345,033

(22) Filed: Jan. 15, 2003

(65) Prior Publication Data

US 2004/0135867 A1 Jul. 15, 2004

(51) Int. Cl.
*B41J 3/407* (2006.01)
*G06K 7/10* (2006.01)

(52) U.S. Cl. .................................. 347/106; 235/462.01

(58) Field of Classification Search ................. 347/101, 347/105, 106; 235/380, 342, 462.01, 487
See application file for complete search history.

(56) References Cited

U.S. PATENT DOCUMENTS 4,875,174 A * 10/1989 Olodort et al. ............. 715/507
5,681,660 A * 10/1997 Bull et al. .................. 428/500
5,939,207 A * 8/1999 Fensore et al. ............ 428/32.8
6,025,017 A * 2/2000 Roth .......................... 427/146
6,383,631 B1 * 5/2002 Mehta ........................ 428/352
6,644,764 B2 * 11/2003 Stephens, Jr. .................. 347/3
2001/0023004 A1 * 9/2001 Shvartsman et al. ....... 428/41.4
2002/0146545 A1 * 10/2002 Franzoi et al. .............. 428/195
2004/0036720 A1 * 2/2004 Dworsky .................... 345/764

FOREIGN PATENT DOCUMENTS

JP 59098172 * 6/1984

* cited by examiner

*Primary Examiner*—Michael S. Brooke
(74) *Attorney, Agent, or Firm*—Susan M. Schmitt

(57) ABSTRACT

A printed device is provided with an image printed thereon, having a relatively high durability and/or resolution. A printer and method are also provided to produce a high durability image by treating an item to be printed with plasma. In particular, a printer is provided that is configured to convey a plurality of individuated items through a plasma treatment stage to prepare the surfaces of the item for printing. More specifically such printer may use a non-continuous ink jet printing assembly such as a drop on demand printing assembly.

21 Claims, 10 Drawing Sheets

PRINTED ITEM HAVING AN IMAGE WITH A HIGH DURABILITY AND/OR RESOLUTION

FIELD OF THE INVENTION

The invention relates to a printed item, and a printer and method of manufacturing the same wherein an image printed on the item has a relatively high durability, resolution, appearance, and consistency of image quality.

BACKGROUND OF THE INVENTION

Various printing techniques have been developed over time to increase the speed and reduce the cost of printing an item. However, more recently, individualized printed products or individualized sets of product have become desirable, such as, for example, individualized cards such as credit cards, gift cards, loyalty cards, membership cards, identification cards or tags, point of sale activated cards, telephone cards, etc. These types of products have required individual codes, characters or other depictions printed on individual items. Requirements for individualization have resulted in a variety of constraints affecting parameters such as printing quality, speed, cost, durability, resolution and materials.

A number of printing techniques have been used to print individualized items or sets of items, such as card substrates or other objects. One of such techniques is thermal transfer printing. Thermal transfer printing typically consists of printing from a colored ribbon, e.g. a pigmented foil resin ribbon, and transferring a dye or pigmented resin onto a card. In many instances in order to get good pigment adhesion to the substrate, thermal transfer printing includes melting the resin into the surface of the substrate, typically a plastic such as polyvinylchloride (PVC). One problem with thermal transfer printing techniques is that the quality of the printing may be compromised by debris on the item. In addition, this debris can damage the print heads used and cause costly repairs. Unprinted areas or gaps in printing may be formed, e.g., by damaged printheads or a wrinkled ribbon, and thus the consistency of appearance quality may be compromised. In addition, the printed image has poor durability; it can be removed through the use of a common, ordinary pencil eraser.

Other printing techniques used for such individualized items or sets include embossing of characters, dye sublimation to form characters and laser techniques to etch, heat or burn printing into the surface or core of an item. Some of these techniques have been relatively slow and inefficient, requiring costly materials and equipment. These techniques typically require special substrates, safety shielding and ventilation. Still other of these printing techniques such as xerography, require special substrate materials to accept the toner from the drum and are not designed for individuated items but rather for sheets of materials.

Some faster, more efficient technologies, such as ink jet printing have been used in printing individual items. In general, current ink jet printing techniques involve directing droplets of inks through the air onto a substrate. Currently two different types of ink jet printing are being commercially utilized: continuous and drop on demand ink jet printing. Continuous ink jet printing provides a continuous flow of ink through or within the printhead during the process. Continuous ink jet printing typically involves chargeable organic solvent or water based inks that are directed onto a surface by providing a continuous stream of droplets of ink that are either charged or not charged according to a desired printed image or template. In some systems, the un-charged drops are printed onto to the substrate while the charged drops are deflected and not printed. Conversely, in other systems, the charged droplets print. Other continuous ink jet systems use a variable deflection voltage to steer the individual droplets. Because the continuous ink jet process requires a continuous stream of ink be supplied, the inks selected typically have a low viscosity. Also, the selected inks typically become integrated with the surface on which they are printed because the typically selected solvents (e.g, acetone and methylethylketone) permit this.

One disadvantage of continuous ink jet products is that the resolution and durability are not high. Another disadvantage is that the flight of the droplets is not always consistent resulting in a poor image appearance, e.g., wavy bars in bar codes and text. This may affect the desired appearance and/or the readability of the coded information in certain applications. Furthermore, continuous ink jet printing is not economical requiring continuous flow of ink through or into the printhead and thus more ink and fluid. Continuous ink jet printing also has highly complex equipment with high maintenance costs. Continuous ink jet printing processes have been used to print on insulated wires where the insulated wires come in a long continuous strands. The insulation of the wires has been plasma treated to improve adhesion of the ink to the substrate. This process uses organic solvent-based inks that become integrated with the surface of the insulation on which they are printed and the process is not used to control flow of droplets over the surface after being applied.

Non-continuous ink jet printing uses solvent or water-based inks and apply ink on demand ("drop on demand" application or "DOD"). This type of printing technique is used in lieu of continuous ink jet printing to print items. The advantages of using DOD ink jet printing are that there are lower consumable costs such as ink and other fluid, lower capital costs and lower maintenance costs. However, one disadvantage to this technique is that because the ink in a printhead is not continuously used, it may dry on face of the printhead leading to poor print quality. Accordingly, slower drying solvents are used and thus the inks commonly used in drop on demand printing techniques do not dry quickly when applied to a substrate surface. The slower dry time increases the chances that the ink droplets will spread in an undesirable or uncontrolled manner across the substrate. The individual droplets of ink will fail to spread sufficiently or will spread too much. This is particularly the case with items made of non-absorbent or less absorbent substrates such as plastics. It is believed that dry time in drop on demand printing processes tends to affect appearance negatively at least in part because drop on demand inks are typically less volatile, e.g., than continuous ink jet printing ink, and in using less volatile inks, the dry time tends to allow the printed ink to flow for a longer duration on the substrate, which will alter appearance. Also, inks used in drop on demand printing tend to sit on the top of the substrate more while continuous ink jet inks attack and penetrate the substrate. Thus continuous ink jet inks will tend to integrate more with the substrate surface.

Accordingly, appearance of the printed image using drop on demand printing may be negatively affected. Additionally, the results of image quality using drop on demand printing can be unpredictable, particularly with relatively less absorbent substrates such as the PVC or other plastic cards that are typically used for individually coded transaction cards. The substrate materials and printing surface conditions tend to vary widely from type, form, material, condition, and age of the substrate, and from batch to batch, from piece to piece of substrate of the same or similar construction and at various locations on the surface of a particular substrate. Thus the results of printed image quality have varied in different locations on individual items, from item to item and batch to batch. Attempts have been made to treat the substrates with coatings or primers to reduce surface variability. However, they are typically applied to the substrate and dried or cured in a separate step, which introduces additional manufacturing steps and costs. They also change the consistency of appearance of the substrate. Coatings and primers change the glossy appearance from a continuous uninterrupted sheet to a patchwork like configuration of different surfaces. Some coatings have covered the desired glossy surface of the card. Because of their receptivity to inks, coatings and primers tend to attract dirt markings and will lead to a poor appearance over time.

Furthermore, the appearance and image quality of the product may be compromised over time and usage of the product. The appearance, edge contrast and/or color density of a printed image may be of particular importance in certain applications such as bar codes and products where such parameters have performance or marketing significance. Images printed with non-continuous ink jet printing (and other printing processes) can be easily rubbed off in normal use. In certain products, the printed images may subjected to conditions where the printed image is rubbed or used under physical conditions that cause the image appearance, edge contrast and color density to degrade over time. For example, transaction cards are subjected to repeated rubbing when read by a scanner or other conditions where the user carries, uses and stores the card. It would therefore be desirable to provide a printed image having improved durability over time and usage of the product.

All these printing techniques have had other problems including, slow dry time, poor resolution, and poor durability. Some printing systems such as ink jet systems, thermal transfer printing and dye sublimation have had such poor durability that they require an additional coating or clear layer on top of the printing to protect the printed image.

Furthermore, printing individuated items consistently has had various challenges and problems. Variations occur on the surface from item to item and in different areas on the same item. Other surface effects may occur from, e.g., handling when printing, finger prints, scratching when feeding or rubbing, and other non-visible surface effects that occur when the individual items are handled or fed onto a conveyor.

Accordingly it would be desirable to provide improved individualized and/or individuated printed products with greater durability, resolution, appearance, and consistency of image quality that may be efficiently produced.

It would also be desirable to provide individualized transaction cards, such as cards with codes or identification printed thereon, with greater durability and resolution.

It would also be desirable to provide an improved drop on demand printer and printing method that improves the appearance and consistency of product image quality of items printed with a drop on demand printer.

SUMMARY OF THE INVENTION

The present invention provides printed items with improved image durability, appearance, resolution, consistency of product, and/or production efficiency. The present invention also provides a printer and a method of manufacturing such items. This invention also provides an image printed on an item that has an improved appearance and resolution.

One embodiment of the invention provides variable imaging where individual items are printed with variable images such as, e.g., identification information or coding (e.g., bar coding). One embodiment provides printing of codes or identification information on transaction cards such as loyalty cards, gift cards, point of sale activated cards. Another embodiment provides printing of sets of individual items such as, e.g., business cards with high durability and/or resolution. According to one embodiment, the printer comprises a conveyor, a treatment stage and a drop on demand ink jet printhead configured to print on an item that has been treated just prior to printing. Where a UV curable or other curable ink is used, the printer further comprises a curing stage. According to one embodiment, the treatment stage comprises a plasma treatment stage where a plasma is applied to the surface of an item to at least temporarily change the surface characteristics of the item. The surface of the item is altered at least just prior to applying the ink to the item. The amount of treatment required is that which is sufficient to create a modified surface in which the ink optimally spreads. The treatment parameters may be variably selected depending on the substrate characteristics, the ink characteristics and the printing technique. The desirable treatment level may depend on the surface tension of the ink with respect to the surface energy of the item. The surface energy in one embodiment is increased to improve ink flow characteristics upon printing, and thereby improve appearance.

The plasma treatment element directs ionized gas toward the substrate to treat the surface. In one embodiment, ionized argon gas is used in the substrate treatment. The plasma treatment element may also include means for containing the plasma to direct the plasma towards the substrate and to improve exposure time of the substrate to the plasma. The direction of the plasma gas may be accomplished in a number of different manners. The items may be conveyed across a plasma outlet from an electrode head where gas is ionized to treat a surface of the item. Multiple passes of the substrate through the plasma may be used. Multiple streams and a number of different treatment stage configurations may be used to direct the location of the treatment on the substrate and to concentrate the treatment on the substrate. The dwell time of the substrate under the treatment may be varied, e.g., by adjusting the conveyor speed.

In one embodiment, the invention provides a printed item that has a printed image on a plastic substrate. Such substrates or laminates are typically used where durability of the item is desired, e.g. to prevent staining of the item during storage or use, or to otherwise minimize degradation and enhance product life. Such substrates are thus typically inherently less receptive to inks, particularly inks that may be used in drop on demand printing techniques prior to treating according to the invention. Thus an embodiment of the invention further provides treating a plastic substrate with plasma prior to printing an image on the substrate.

In another embodiment, the invention provides a printed item that is printed on a transaction item such as a card. In another embodiment, a plurality of individual items are treated with plasma then printed. In order to treat the items with plasma, in one embodiment, the plasma is directed toward a specific area or surrounding area of the substrate surface on which the printing is to occur. In one variation, plurality of items to be a treated is a plurality of individuated cards or sets of cards such as, e.g., loyalty cards, point of sale activated cards, ID cards, or business cards. In a further variation, a unique identifying image or code such as a bar code or an alphanumeric image is printed on each of a plurality of individualized items or cards.

DETAILED DESCRIPTION OF THE DRAWINGS

DETAILED DESCRIPTION

Figure 1A:
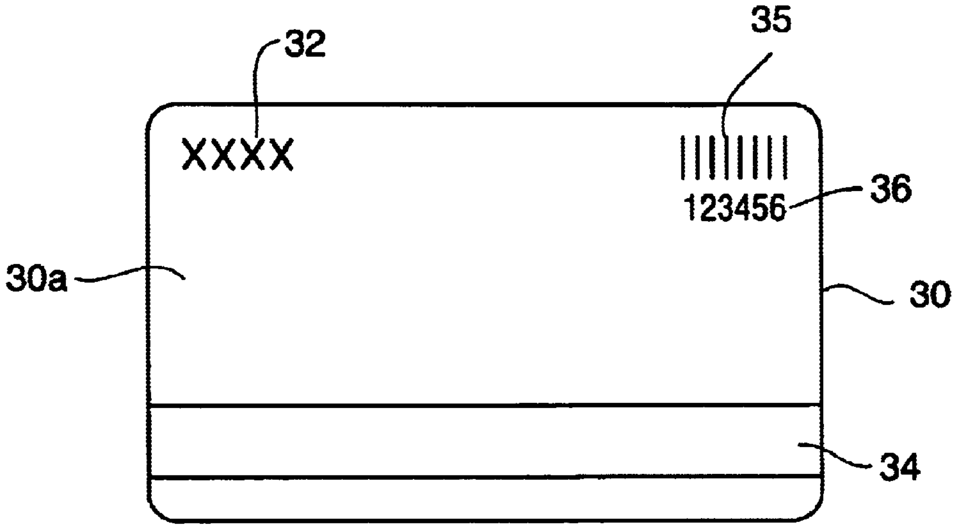
FIG. 1A illustrates a front view of a printed device of one embodiment of the invention.
Figure 1B:
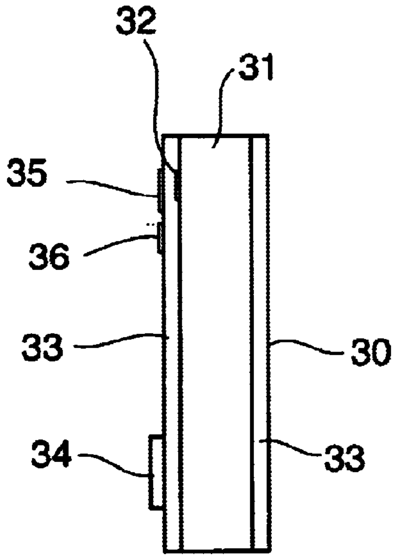
FIG. 1B illustrates a side view of the printed device of FIG. 1A

Referring to FIGS. 1A and 1B, a first embodiment of a printed device of the present invention is illustrated comprising a card 30 which is one of a plurality of individuated cards where each card has printed thereon, a unique or individual image corresponding to that particular card. Such image may be, for example, a bar code, an identification number or character; or activation code, etc.

According to one use of the card 30, it may have a prepaid cash value activated at the point of sale. Typically with such a point of sale activated card, after a user purchases a card, an account activation device at the point of sale is used to activate an account corresponding to the device. Upon activation, the account is typically assigned a predetermined value. After the card is purchased and the account activated, the cards may then be carried by a user so the user may access the account via an encoded device or pin number on the card having data associating the card with the account. As the user uses the device or card, a corresponding value is deducted from the value of the account corresponding to the card. In this particular embodiment, a magnetic strip 34 is provided on the card 30 which may be read at the point of sale by a magnetic card reader to activate the card 30 for a prepaid value. Alternatively, the bar code 35 printed on the card 30 may be read by a scanner to activate the account. The PIN number 36 printed on the card corresponds to the user's individual account activated using the magnetic strip 34 or bar code 35.

The card 30 comprises a substrate 31 of a material such as, e.g., cardboard or plastic. The card 30 may also include a laminate 33 formed by a material, such as e.g., PVC, PET, polyester, polypropylene or ABS, laminated onto at least one planar side 30*a* of the substrate 31 to protect an image or images 32 printed on the substrate 31, such as, e.g., advertising, terms, or other information common to a series of similar printed devices. The laminate 33 may also provide strength, stiffness, crack resistance, water resistance or otherwise protect the substrate. The laminate may have multiple layers, each layer serving different purposes. A magnetic strip 34 is applied to the laminate for example by heat transferring the strip 34 on to the surface of the laminate or using other known techniques. Alternatively a non-laminated card may be used. The durability and resolution of the printed image of the bar code 35 and PIN number 36 is relatively high as described in more detail below. In one embodiment, a bar code 35 and a PIN number 36 are printed onto the laminate 33 as using a printer and manufacturing method as described in more detail below with reference to FIGS. 2–8.

Figure 8:
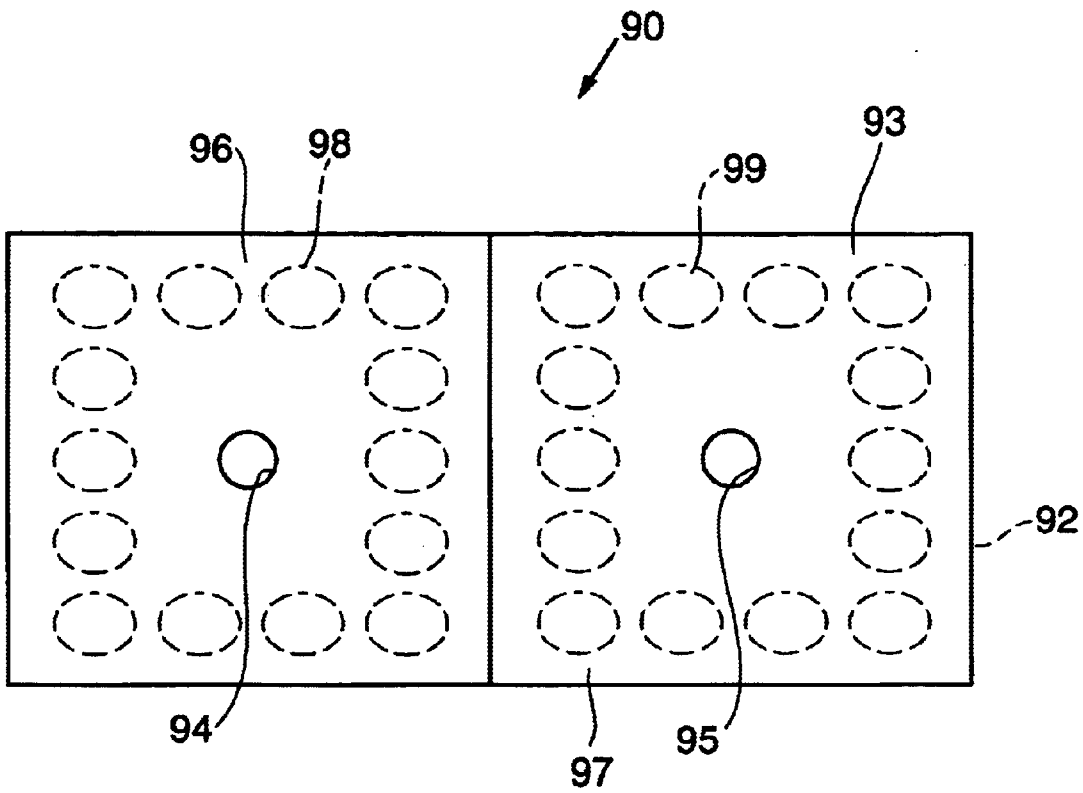
FIG. 8 illustrates a schematic top view of plasma treatment element according to another embodiment of the invention.
Figure 9B:
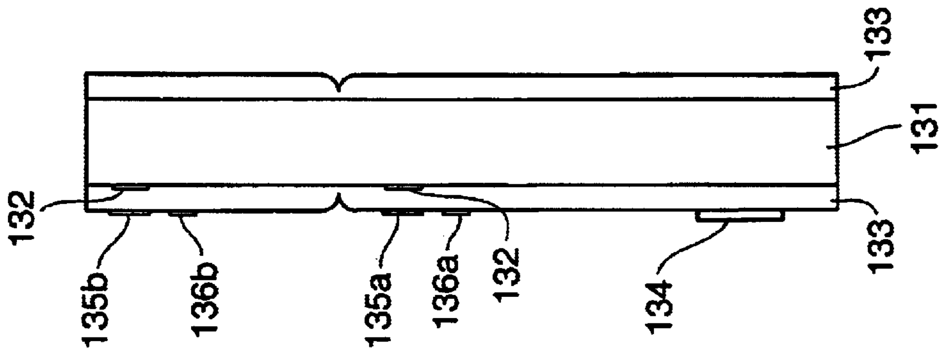
FIG. 9 illustrates a schematic front view of another embodiment of a printed item according to the invention.
Figure 9A:
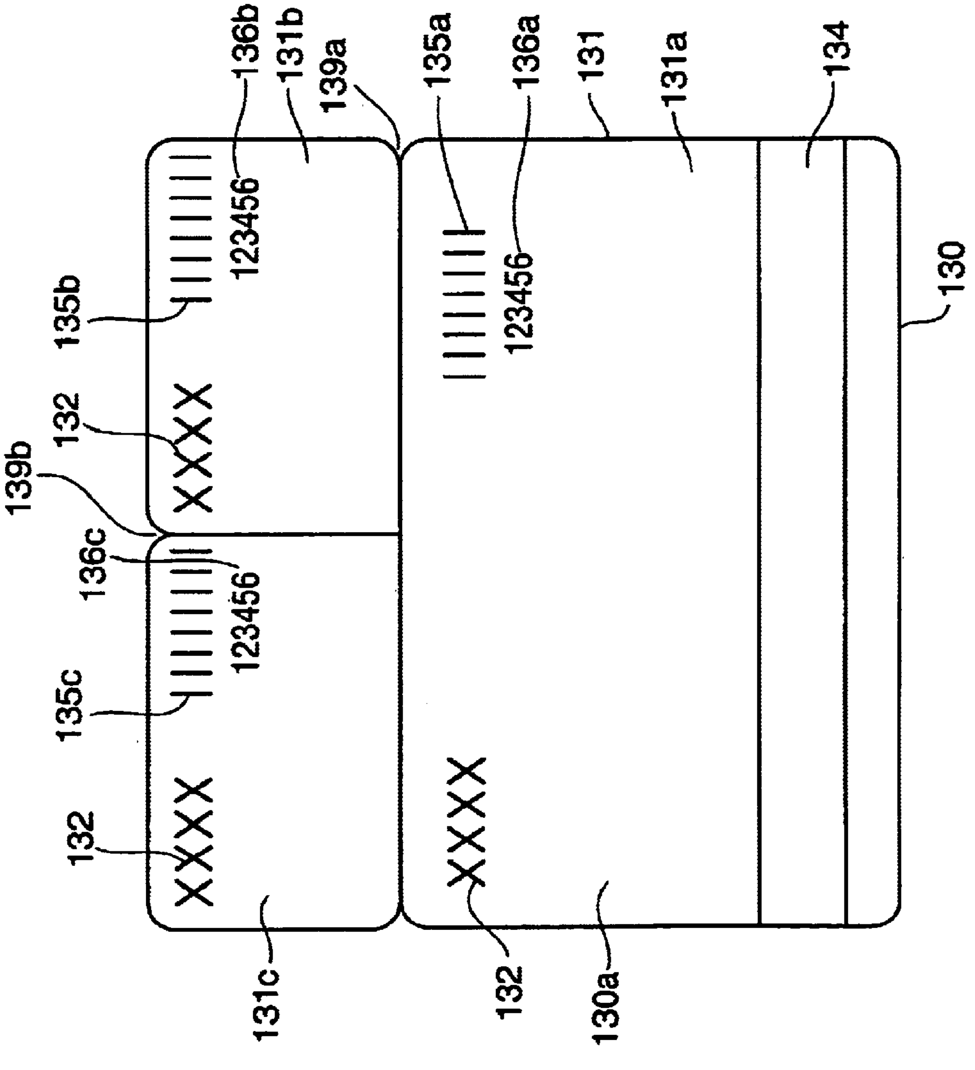

FIG. 9 illustrates another embodiment of a printed item according to the invention. Item 130 comprises a substrate 131 of a material such as, e.g., cardboard or plastic. The item 130 is perforated along lines 139*a* and 139*b* to provide a plurality of items 131*a*–*c*. The card 130 may also include a laminate 133 formed by a material, such as e.g., PVC, PET, Polyester or ABS, laminated onto at least one planar side 130*a* of the substrate 131 to protect an image or images 132 printed on the substrate 131, such as, e.g., advertising, terms, or other information common to a series of similar printed devices. A magnetic strip 134 is optionally applied to the laminate for example by heat transferring the strip 134 on to the surface of the laminate or using other known techniques. A identical or corresponding bar codes 135*a*–*c* and identical or corresponding PIN numbers 136*a*–*c* are printed respectively onto items 131*a*–*c*. Items 131*a*–*c* are printed on the same substrate 131 and maybe separated from each other, e.g., at score lines that may be formed in the substrate 131. The items 131*a*–*c* represent multiple copies of the same items or different sizes and shapes of items that carry related information in the image 132 printed on the substrate 131. The items 131*a*–*c* may be multiple transaction cards associated with the same account or user information. In this particular embodiment, the PIN numbers 135*a*–*c* are either identical or related and the bar codes 136*a*–*c* are either identical or related. The durability and resolution of the printed image of the bar codes 135*a*–*c* and PIN numbers 136*a*–*c* is relatively high as described in more detail below. In one embodiment, a bar codes 135*a*–*c* and a PIN numbers 136*a*–*c* are printed onto the laminate 33 as using a printer and manufacturing method as described in more detail below with reference to FIGS. 2–8.

Figure 2:
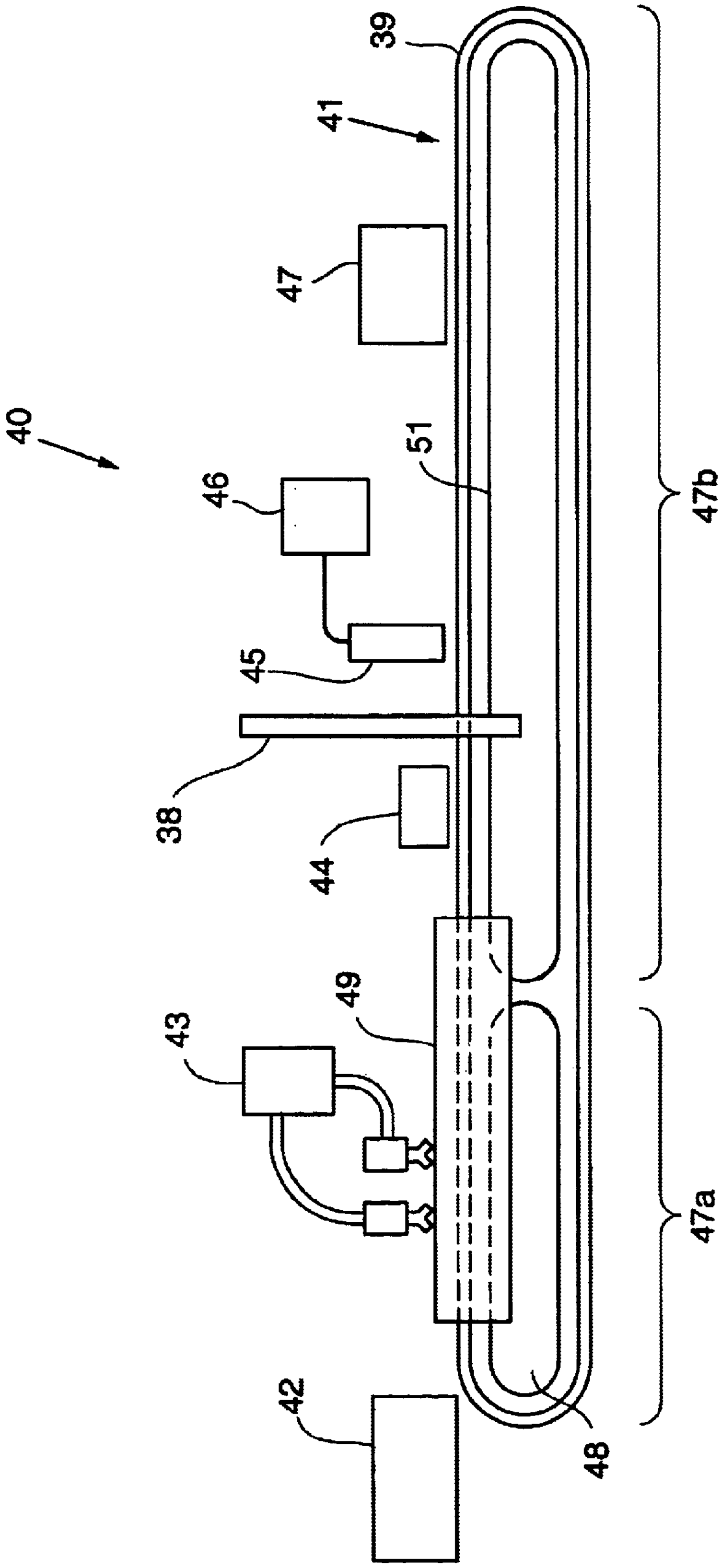
FIG. 2 illustrates a schematic of one embodiment of the printer of the present invention.

FIG. 2 illustrates a schematic of a printer 40 according to one embodiment of the invention. As illustrated in FIG. 2, the printer 40 comprises a feeder 42 for feeding individual items on a conveyor 41. The conveyor 41 moves the individual items past a plasma treatment element 43 that treats the surface of at least one planar side 30*a* of the card 30, which is exposed to the plasma treatment element 43. The conveyor 41 subsequently conveys the card 30 through an electrostatic cleaner 44 that removes some of the electrostatic charges associated with the item, e.g., card 30 or item 130. The electrostatic cleaning step may also be performed prior to the plasma treatment, including at the feeder 42 during the feeding step. Alternatively, the procedure may be performed without the electrostatic cleaning step. The conveyor 41 then conveys the item through the printhead assembly 45 having one or more printheads, where an individual image is printed on the surface of the item such as the laminate 33 or 133 of the card 30 or item 130 respectively, according to FIGS. 1 and 9. With respect to the card 30 of the embodiment of FIGS. 1A and 1B, a bar code 35 and a PIN number 36 are printed on the card 30 and with respect to the item of the embodiment of FIG. 9 bar codes 135*a–c* and PINs 136*a–c* are printed on the item 130. The printhead assembly 45 is controlled by a controller 46 to apply ink to the card 30. The conveyor 41 then conveys the card 30 to a curing element 47 to cure the curable ink onto the laminate 33 surface or the card 30. The ink is preferably a curable ink that may be cured for example, using ultraviolet radiation, heat, electron beam initiation, ionizing radiation, or the like.

The feeder 42 according to this embodiment is a pick and place feeder that picks up and places the card on the belt avoiding surface interaction including, e.g., lateral abrasive or static inductive movements. Such feeders are commercially available, for example, pick and place feeder MGS model RPP-221. Other feeders may be used that minimize creation of surface distress, abrasions or electrostatic charge on the card surface, such as, for example, stream feeders or manual feeding processes.

The conveyor 41 may be a belt type conveyor and it may include a plurality of belt segments. The belt (or belt segments), particularly where the treatment is occurring, is preferably sufficiently ungrounded or non-conductive so as to prevent arcing or other unwanted or uncontrolled electrical discharge, such as, e.g., a multi-layer rubber belt resistant to ionizing radiation. The belt(s) should be selected so as to minimize creation or condition of a charge. For example, a suitable material may include urethane or nylon. Preferably the belt(s) is heat resistant and stable with the curing method used.

The first portion of the conveyor 41*a* from the feeder 42 through the treatment device 43 has base 48 of nylon (or other minimally conductive material) over which the conveyor belt moves. Alternatively, the first portion may be a nylon belt segment of a multiple segmented type belt conveyor. Adjacent the treatment device 43, the conveyor 41 further comprises nylon bumper side rails 49 that contain the plasma as it is being applied and guide the substrate passing through on the conveyor 41, thus providing a greater concentration of plasma during treatment.

The second portion of the conveyor 41*b* comprises a base 50 having a vacuum chamber 51 and openings 50*a* in the top portion of the vacuum chamber 51 so that a vacuum may be applied from the vacuum chamber 51 (coupled to a vacuum source) between the belt 39 and the stainless steel base 50. The vacuum helps to stabilize the movement of the item or substrate conveyed on the belt 39, particularly past the printhead during printing. The second portion of the conveyor 41 may also comprise a segment of a multiple segmented type conveyor.

The electrostatic cleaner 44 in one embodiment follows the plasma treatment to reduce any static charge that may be introduced by the plasma treatment. The electrostatic cleaner 43 may comprise an electrode to which a voltage is applied or a radioactive material which emits ions. In one embodiment, the cleaner 43 comprises a static neutralizing bar positioned over the items conveyed by the conveyor 41 such as, e.g., a Simco Shockless Static Neutralizing Bar Model 7000V RMS) that acts to remove static from an item conveyed past the bar. Another electrostatic cleaner assembly may be used where an air flow is created over the static bar to blow charged air over the substrate. The static removal element preferably includes a non-conductive material base beneath the static bar. In an alternative embodiment, the electrostatic cleaning step precedes the plasma treatment stage. Alternatively, the electrostatic cleaning step may be omitted.

Figure 4:
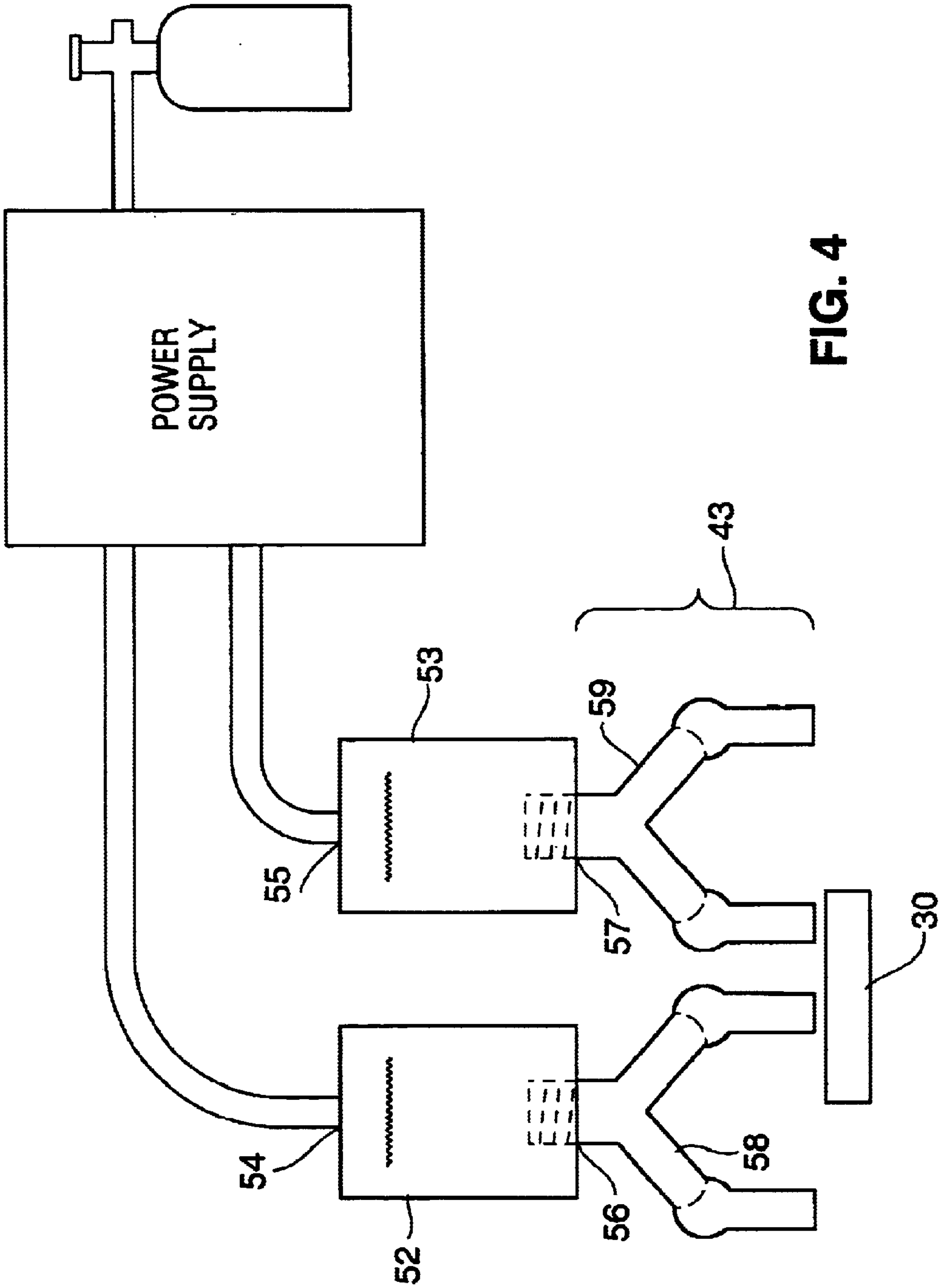
FIG. 4 illustrates a plasma treatment element according to an embodiment of the invention.

The plasma treatment device 43, shown in more detail in FIG. 4, comprises two electrode bodies 52, 53 with input ports 54, 55 for supplying gas such as, e.g., argon, to the electrode heads 52, 53. The heads 52, 53 are preferable formed of a nonconductive material such as plastic to avoid grounding out of the electrode head. The electrode heads 52, 53 are similar to commercially available electrode head but that provide threaded outputs 56, 57 for outputting the gas as a plasma after being ionized by electrodes in the electrode heads 52, 53. Bifurcated nozzles 58, 59 are configured to be received by threaded outputs 56, 57. The bifurcated nozzles 58, 59 each direct the flow of plasma towards a card 30 or other item or substrate. In one embodiment, the argon gas is supplied to the electrode head a pressure of about 10–30 psi. Alternative threaded nozzles may be used in the place of nozzles 58, 59 depending on the desired area, focus, concentration, pressurization, etc. of the plasma stream used to treat the card 30 surface or other item. The focus and direction of the plasma flow may be altered, for example by selecting an alternative nozzle or nozzles that direct the plasma towards and area for printing on the substrate and provide the desired amount of treatment. Thus, one aspect of the invention provides a plurality of selectable nozzles.

The plasma treatment serves to at least temporarily modify the surface energy of the substrate surface. It is believed that among other things the plasma treatment modifies as least temporarily, the chemical bond characteristics of the surface. The surface of the item is modified at least just prior to applying the ink to the item. It is also believed that the plasma treatment may modify the surface energy of the substrate surface, which permits better flow of ink deposited on the substrate and thus a better resulting appearance. It is also believed that the plasma treatment enables ink spread and interaction such that ink cohesion is improved, thereby improving durability of the printed image. As surface energy increases, spot size increases for a given drop size of ink. The treatment required is that which is sufficient to modify the surface so that the ink optimally spreads. This treatment may be variably selected depending on the substrate characteristics, the ink characteristics and the printing technique. The desirable treatment level may depend on the surface tension of the droplets of ink with respect to the surface energy of the item. The surface energy is preferably increased to improve ink flow characteristics upon printing, and thereby improve appearance and durability. The plasma treatment level may be increased in a number of manners, by moving the card more slowly past the plasma head, increasing the voltage, reducing the area of the nozzles, or increasing the number of nozzles arranged across or in series in the treatment area.

After passing through the treatment device 43, the card 30 moves along the conveyor to the printhead assembly 45 where an image is printed on the plasma treated surface. Preferably a shield is placed between the printhead assembly 45 and the plasma treatment device 43. The shield 38 is constructed of a thin conductive material arranged on grounded supporting members. The shield 38 serves to block electromagnetic interference from affecting the printhead operation. The printhead assembly 45 in this particular embodiment is a drop on demand ink jet printer that is adapted to print using UV curable inks. Such printheads may be adapted for such use or are commercially available, for example, a Xaar 500 TM or a Xaar 128 printhead.

A printed substrate is conveyed to the curing station 47 from the printhead assembly 45. The time between printing and curing, i.e., dry time, can affect the ink flow on the substrate. The time between printing and curing may be adjusted by altering the speed of the conveyor and or distance between the printhead assembly 45 and the curing station 47. The adjustment may depend, among other things, on the type of ink selected or used.

Figure 5A:
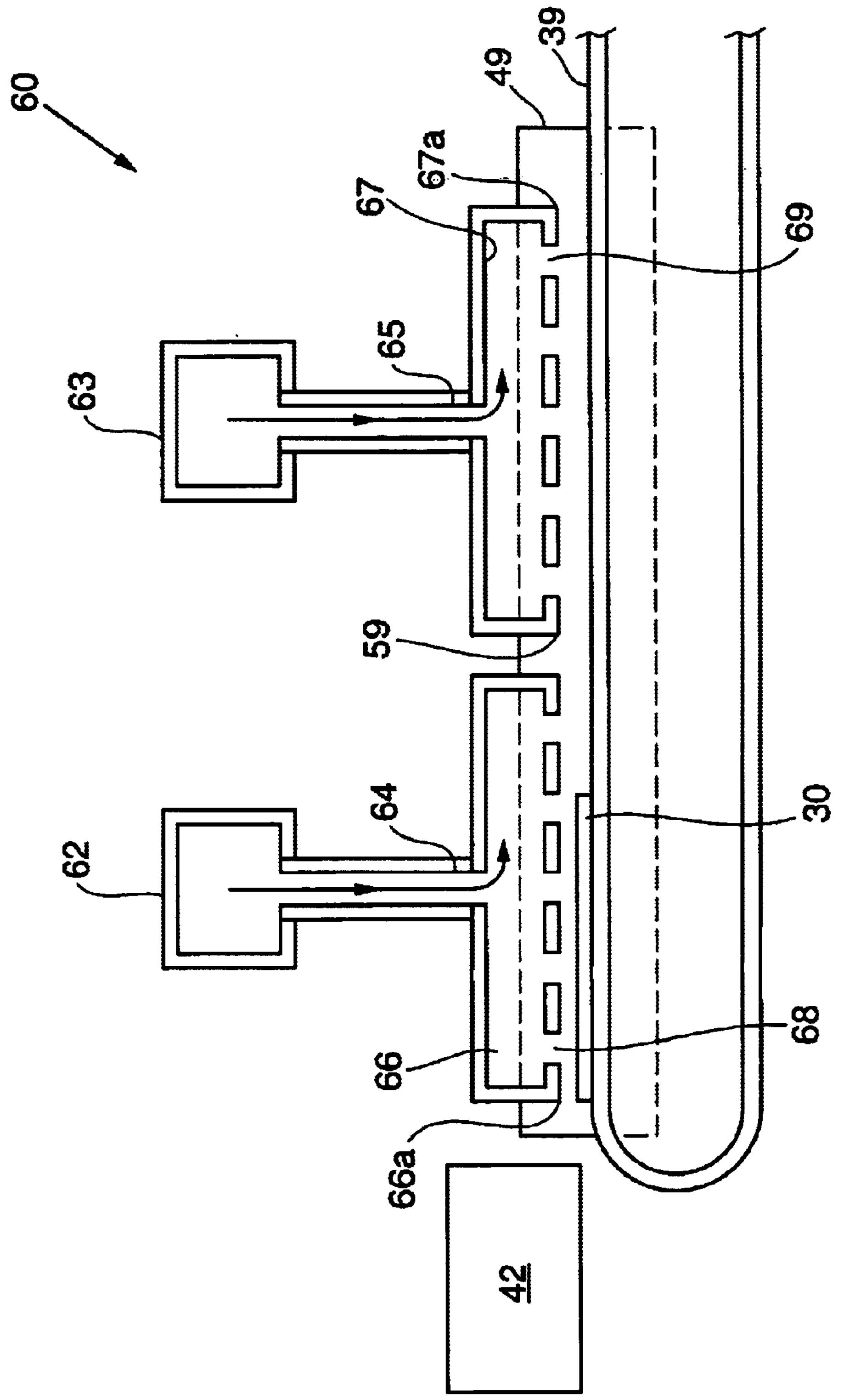
FIG. 5A illustrates side schematic view of a plasma treatment element according to another embodiment of the invention.
Figure 5B:
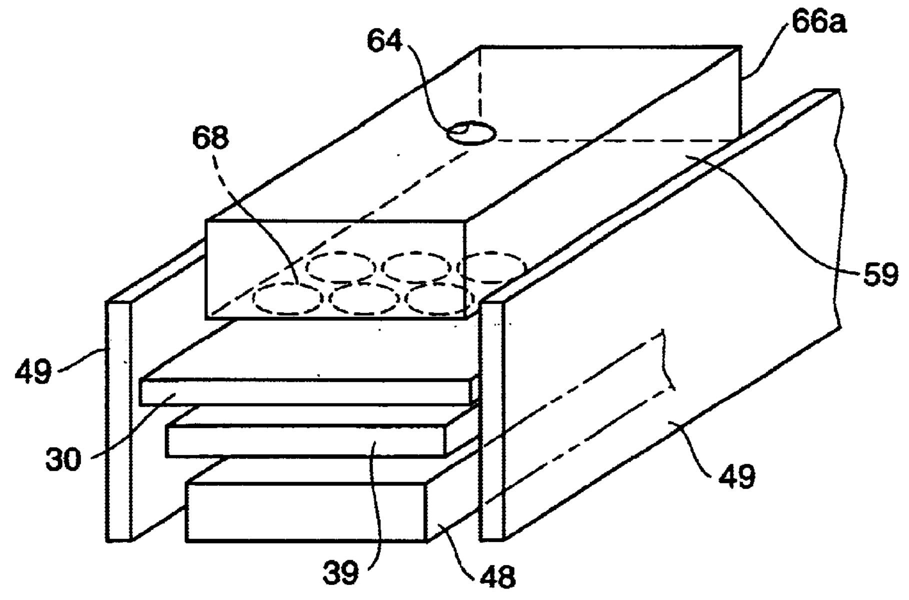
FIG. 5B illustrates a schematic perspective view of the plasma treatment element of FIG. 5A.
Figure 5C:
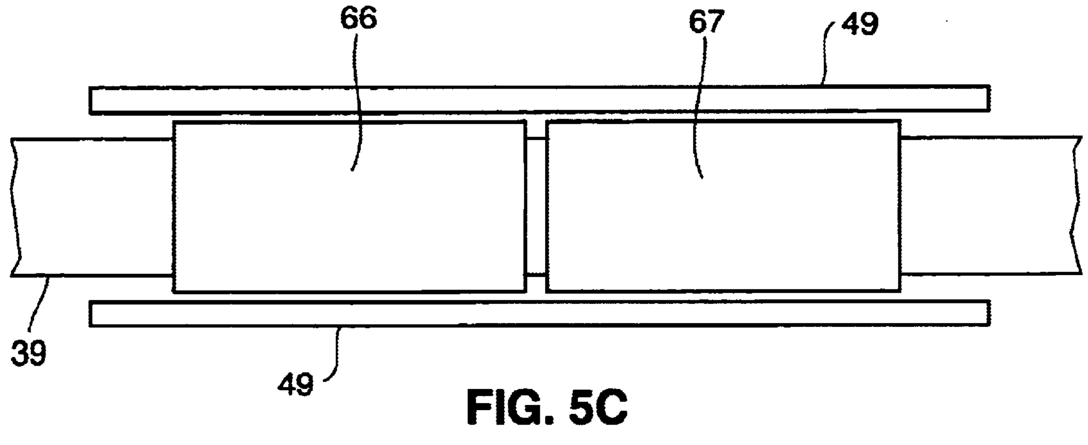
FIG. 5C illustrates a top view of the plasma treatment device of FIG. 5A.

FIGS. 5A-5C illustrate an alternative embodiment of a plasma treatment device to be used with a printer having a feeder 42, electrostatic cleaner 44, printhead assembly 45 and curing station 47 as illustrated in the embodiment of FIG. 2. The treatment device 60 comprises electrode heads 62, 63 having outputs 64, 65 into chambers 66, 67. The chambers 66, 67 include openings 68, 69 corresponding respectively to each chamber that direct the plasma onto a substrate located on the belt 39. The floors 66*a*, 67*a* of the chambers 66, 67 form a ceiling 59 over the belt 39 and any substrate (e.g. card 30) moving through the treatment device 60, while the side rails 48 enclose the treatment device 60 on the sides. Thus, the belt 39, the ceiling 59, and the side rails 48 in combination form a tunnel through which the substrate passes when applying a plasma treatment substantially increasing the exposure of the substrate to the plasma. In this particular embodiment, the openings 68 are aligned in rows and the openings 69 are aligned in rows.

Figure 6:
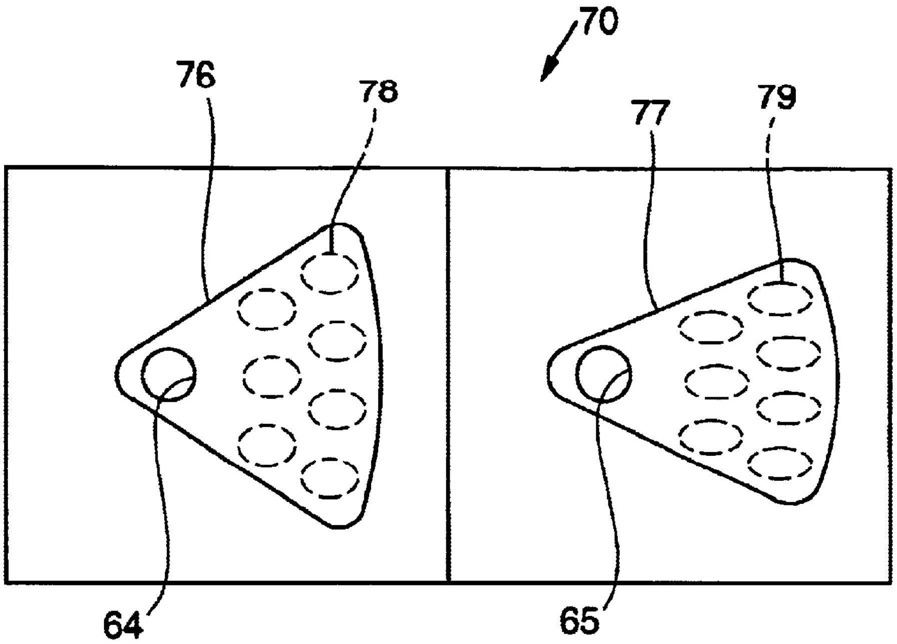
FIG. 6 illustrates a schematic top view of plasma treatment element according to another embodiment of the invention.
Figure 7:
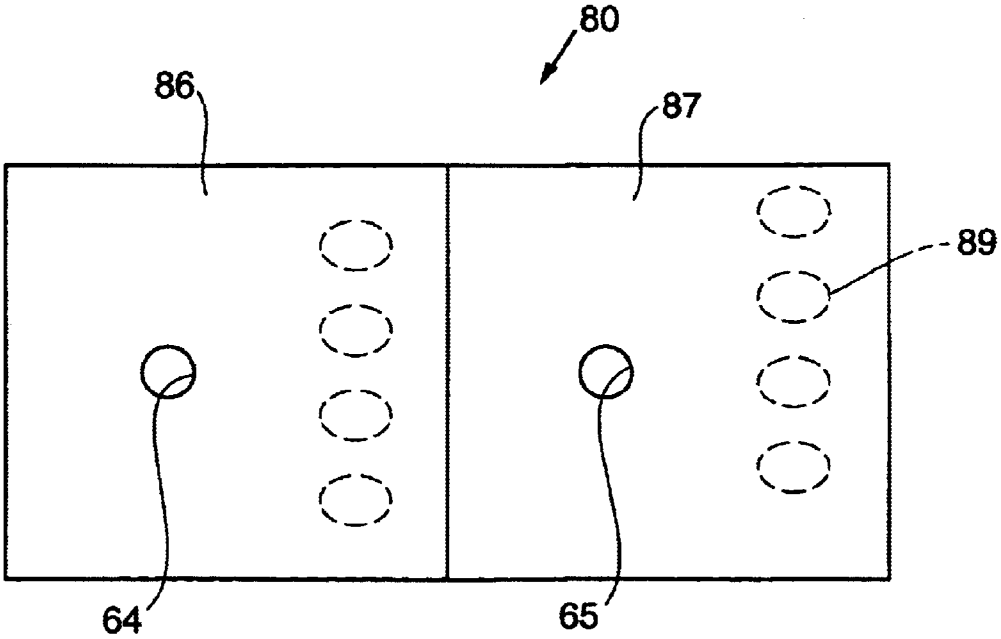
FIG. 7 illustrates a schematic top view of plasma treatment element according to another embodiment of the invention.

FIGS. 6–8 illustrate alternative chamber configurations, and configurations of openings out of the chambers through which the plasma is directed. The various configurations improve exposure to plasma, particularly of individual items and/or towards specific areas of the items' surface.

FIG. 6 illustrates an alternative embodiment of chambers 76, 77 of a plasma treatment device 70. The treatment device 70 is constructed in a manner similar to the treatment device 60 except that the openings 78 and the openings 79 are in a staggered configuration and the chambers 76, 77 have a teardrop or tapered configurations to funnel the plasma from the inlet 64, 65 to the openings 78, 79.

FIG. 7 illustrates an alternative embodiment of chambers 86, 87 of a plasma treatment device 80. The treatment device 80 is constructed in a manner similar to the treatment device 60 except that the openings 88 and the openings 89 are in a single line.

FIG. 8 illustrates an alternative embodiment of chambers 96, 97 of a plasma treatment device 90. The treatment device 90 is constructed in a manner similar to the treatment device 60 except that the openings 98 and the openings 99 are located on the outer circumference of the floor 92 of the chambers 96, 97 and the outlets 94, 95 from the electrode heads (not shown) are located in the center of the top 93 of the chambers 96, 97.

Figure 3:
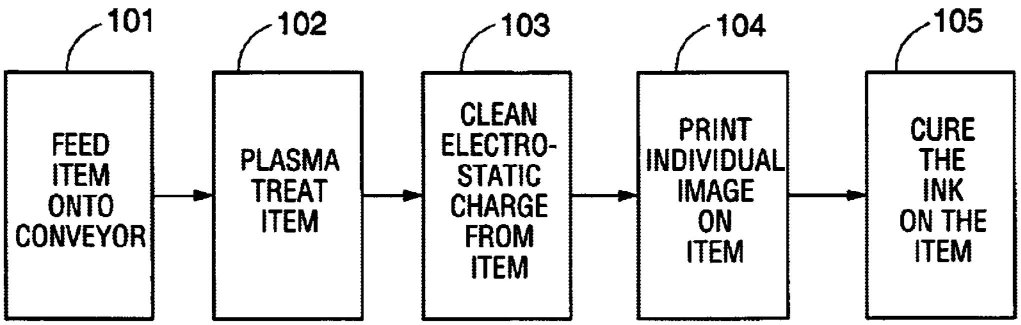
FIG. 3 illustrates a flow chart of a method of printing according an embodiment of the present invention.

FIG. 3 illustrates a method according the invention. According to the method an item is fed onto a conveyor (step 101). A plurality of individual items may be fed onto the conveyor according to this system. The item is then treated with plasma (step 102) by directing plasma towards a surface to be printed on the item. The plasma may be directed towards the surface in a number of manners using a plasma treatment device such as, for example, as described above. A gas is first ionized and then is directed so that the plasma will interact with the surface of the item. After the item is treated with plasma, or alternatively prior to treating the item with plasma, electrostatic charge is cleaned from the item (step 103). The item is then printed on the pretreated surface (step 104). The printing technique may vary. However, in a preferred embodiment, the printing is done using a drop on demand ink jet printing technique. If a curable ink is used, the ink is then cured on the item (step 105).

A number of durability tests may be used to show durability (i.e., maintenance of integrity of a printed image over time, use, or during the items lifetime) of a printed image on a surface. A number of parameters are believed to affect durability, such as cohesion of ink and adhesion of ink to the surface. Cohesion is believed to be of particularly significant importance in particular in drop on demand techniques or using less substrate-penetrating inks. Some of the tests or standards that may be used to express durability include a Taber Abrasion Test where the image is abraded according to the test standard using a Tabor Abrasor. Edge Contrast is analyzed on bar codes subjected to a Taber Abrasion test. After a given number of Taber cycles a determination of readability may be made. Edge contrast, which is a difference between printed and non-printed areas, may be expressed by measuring readability with a bar code reader according to a standard test. Similarly, color density may be determined by measuring color density with a reflection densitometer according to a test standard. The durability can be determined by subjecting an image to Taber Abrasion and then determining the change in color density.

Figure 10:
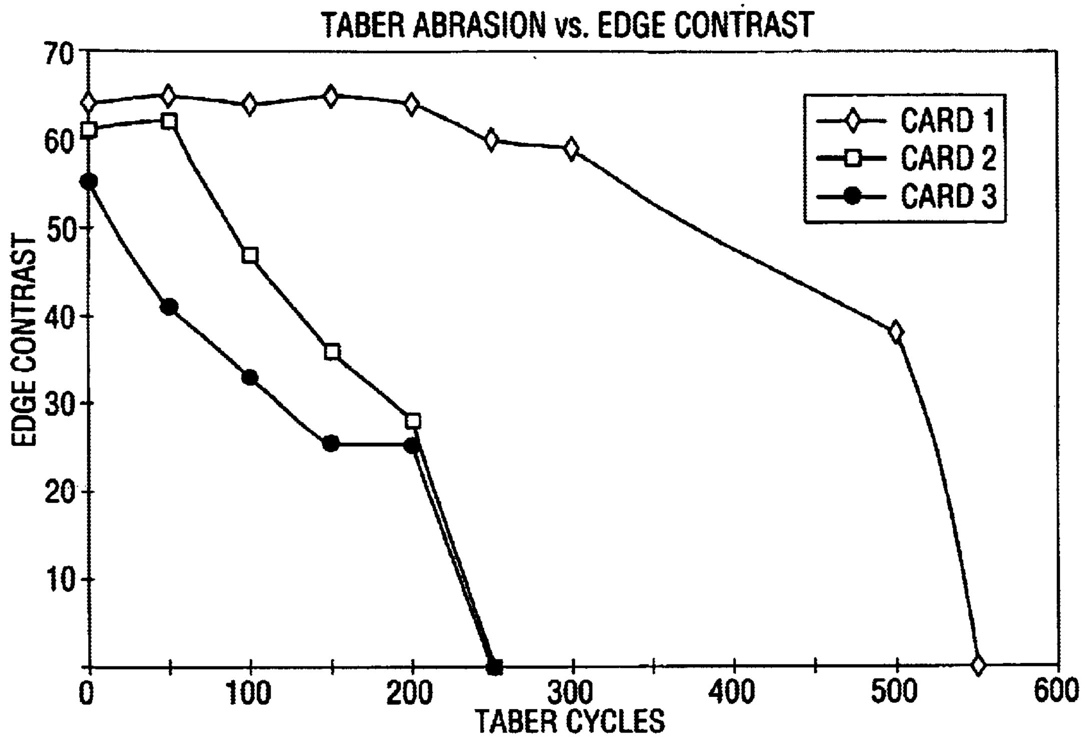
FIG. 10 is a graph of Edge Contrast vs. Taber Cycles for samples of cards having bar codes printed on them using different printing techniques.
Figure 11:
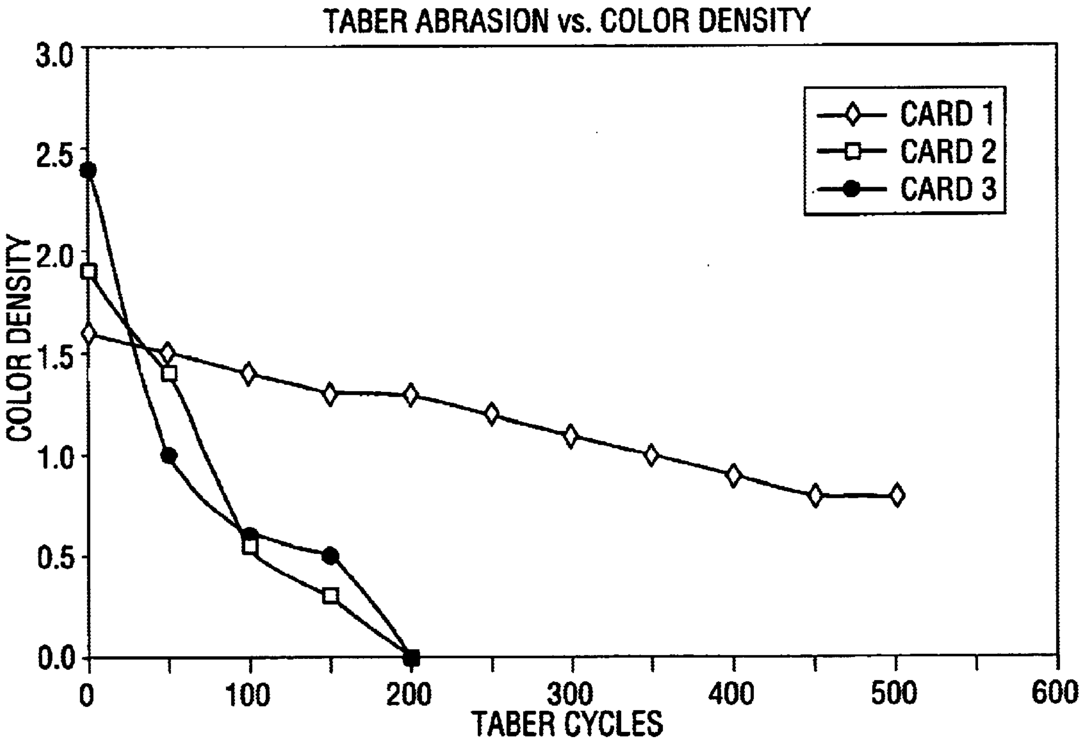
FIG. 11 is a graph of Color Density vs. Taber Cycles for samples of cards having bar codes printed on them using different printing techniques.

The durability of a printed image can thus be expressed as a function of Taber cycles to loss of readability. Durability can also be expressed as Taber cycles to edge contrast or to edge contrast change. Finally durability can also be expressed as Taber cycles to color density or color density change. Tests using Taber Abrasion are generally known in the art. FIGS. 10 and 11 illustrate results of durability tests of cards printed using three different techniques (Cards 1–3). The cards used in the test were constructed of a relatively non-porous material, and more specifically, in the examples described below, were, constructed of 2 layers of a 13 mils thick white PVC core material with a 2 mils thick clear PVC laminate.

| | |
|---|---|
| Card 1 | Printed using Plasma Treatment and Drop On Demand Ink Jet Printing as described herein using a Flint 3004 UV curable ink. |
| Card 2 | Printed using a thermal transfer printing process using an Eltron P310 printer and Sony Black Ribbon. |
| Card 3 | Printed using a continuous ink jet printing process using MEK solvent based ink (Videojet 1681SR) |

EXAMPLE I

A Taber Test was performed on cards having bar codes printed according to various printing techniques ("Bar Abrasion Test"). The bar code on four cards of each type were abraded with a Taber Abrasor using dual CS10F abrasion wheels and 500 gram loads on each wheel. After each 50 cycle increment, the bar code was analyzed for edge contrast using a PCS Bar Code Verifier equipped with a visible light wand. The Taber abrasion wheels were re-surfaced for 50 cycles every 250 cycles of usage. The edge contrast was determined using ANSI specification, ANSI X3.182-1990 Bar Code Print Quality Guideline. Edge Contrast can be defined as the difference between bar reflectance (Rb) and space reflectance (Rs) of two adjacent elements, where each transition from a bar to a space or back again is an "edge". Edge contrast is defined as the difference in peak values in the space (Rs) and that bar (Rb). Each edge in the scan profile is measured, and the edge that has the minimum contrast from the transition from space reflectance to bar reflectance, or from bar to space, is the Minimum Edge Contrast or EC min which is used to determine the "Edge Contrast". The minimum space reflectance adjacent to the maximum bar reflectance is used to determine EC min., i.e., EC min+Rs min−Rb max (worst pair).

The average edge contrast from the four cards after each measurement and for each type of card is summarized in Table I below and are plotted on the graph of FIG. 10. Edge contrast is expressed as a difference in the reflected light percentage.

TABLE I

| Card Type | | Bar Code Abrasion<br>Before Edge Contrast | After 50 Taber Edge Contrast | After 100 Taber Edge Contrast | After 150 Taber Edge Contrast | After 200 Taber Edge Contrast | After 250 Taber Edge Contrast | After 300 Taber Edge Contrast | After 500 Taber Edge Contrast | After 550 Taber Edge Contrast |
|---|---|---|---|---|---|---|---|---|---|---|
| 1 | A | 65 | 65 | 65 | 65 | 65 | 62 | 59 | 42 | NR |
| | B | 63 | 64 | 65 | 65 | 64 | 62 | 60 | 37 | NR |
| | C | 63 | 65 | 62 | 63 | 65 | 59 | 62 | 36 | NR |
| | D | 63 | 65 | 65 | 65 | 63 | 57 | 53 | 36 | NR |
| | E | | | | | | | | | |
| | F | | | | | | | | | |
| | avg | 64 | 65 | 64 | 65 | 64 | 60 | 59 | 38 | |
| 2 | A | 61 | 62 | 54 | 37 | 29 | NR | | | |
| | B | 62 | 61 | 47 | 39 | 28 | NR | | | |
| | C | 60 | 60 | 43 | 30 | 28 | NR | | | |
| | D | 61 | 52 | 43 | 37 | NR | | | | |
| | E | | | | | | | | | |
| | F | | | | | | | | | |
| | avg | 61 | 62 | 47 | 36 | 28 | | | | |
| 3 | A | 56 | 42 | 35 | 28 | 22 | 25 | NR | | |
| | B | 52 | 44 | 35 | 27 | 25 | NR | | | |
| | C | 55 | 37 | 29 | 21 | 27 | NR | | | |
| | D | 55 | 40 | 32 | 24 | 27 | NR | | | |
| | E | | | | | | | | | |
| | F | | | | | | | | | |
| | avg | 55 | 41 | 33 | 25 | 25 | | | | |

NR in this Example means not readable by the Bar Code reader.

EXAMPLE II

A Taber Test was performed on cards having a solid black colored bar printed on cards using the three different techniques A-C described above. The solid black color bar on six cards of each type were abraded with a Taber Abrasor using dual CS10F abrasion wheels and 500 gram loads on each wheel. After each 50 cycle increment, the black bar was tested for color density using a MacBeth model TR927 reflection color densitometer. The Taber abrasion wheels were resurfaced for 50 cycles every 250 cycles of usage. The average color (black) density from the six cards of each type, after each measurement is plotted in FIG. 11 and is set forth in Table II below.

TABLE II

| Card Type | | Bar Abrasion<br>Before Density | After 50 Taber Density | After 100 Taber Density | After 150 Taber Density | After 200 Taber Density | After 250 Taber Density | After 300 Taber Density | After 350 Taber Density | After 400 Taber Density | After 450 Taber Density | After 500 Taber Density |
|---|---|---|---|---|---|---|---|---|---|---|---|---|
| 1 | A | 1.57 | 1.51 | 1.41 | 1.35 | 1.29 | 1.21 | 1.18 | 1.07 | 1.08 | 0.99 | 0.90 |
| | B | 1.57 | 1.49 | 1.49 | 1.36 | 1.27 | 1.24 | 1.14 | 1.08 | 1.05 | 0.99 | 0.97 |
| | C | 1.6 | 1.42 | 1.33 | 1.25 | 1.15 | 1.00 | 0.82 | 0.67 | 0.34 | 0.00 | 0.00 |
| | D | 1.55 | 1.48 | 1.42 | 1.36 | 1.30 | 1.22 | 1.15 | 1.11 | 1.04 | 0.98 | 0.93 |
| | E | 1.56 | 1.48 | 1.41 | 1.33 | 1.28 | 1.23 | 1.16 | 1.08 | 1.02 | 0.96 | 0.89 |
| | F | 1.53 | 1.49 | 1.43 | 1.38 | 1.28 | 1.18 | 1.18 | 1.08 | 1.00 | 0.95 | 0.86 |
| | avg | 1.6 | 1.5 | 1.4 | 1.3 | 1.3 | 1.2 | 1.1 | 1.0 | 0.9 | 0.8 | 0.8 |
| 2 | A | 1.86 | 1.05 | 0.38 | | | | | | | | |
| | B | 1.86 | 1.44 | 0.78 | 0.18 | | | | | | | |
| | C | 1.88 | 1.35 | 0.31 | | | | | | | | |
| | D | 1.86 | 1.65 | 1.01 | 0.34 | | | | | | | |
| | E | 1.88 | 1.48 | 0.61 | 0.21 | | | | | | | |
| | F | 1.89 | 1.46 | 0.57 | 0.26 | | | | | | | |
| | avg | 1.9 | 1.4 | 0.6 | 0.3 | | | | | | | |
| 3 | A | 2.41 | 0.94 | 0.61 | | | | | | | | |
| | B | 2.35 | 0.94 | 0.66 | | | | | | | | |
| | C | 2.43 | 1.00 | 0.68 | | | | | | | | |
| | D | 2.45 | 0.95 | 0.73 | 0.45 | | | | | | | |
| | E | 2.47 | 0.87 | 0.42 | | | | | | | | |
| | F | 2.47 | 1.02 | 0.69 | | | | | | | | |
| | avg | 2.4 | 1.0 | 0.6 | 0.5 | | | | | | | |

In a preferred embodiment, the bar code on the card is readable after greater than 250 Taber cycles, more preferably greater than 300 Taber cycles and most preferably at 500 Taber cycles or greater. In another embodiment the % loss in edge contrast is less than or equal to about 50% after 350 Taber Cycles. In another embodiment the % loss in edge contrast is less than or equal to about 5% after 150 Taber Cycles. In another embodiment the % loss in edge contrast is less than or equal to about 10% after 200 Taber Cycles.

In another embodiment the % loss in color density is less than or equal to about 30% after 150 Taber cycles. In another embodiment the % loss in color density is less that or equal to about 60% after 300 Taber cycles. In another embodiment the % loss in color density is less that or equal to about 60% after 350 Taber cycles.

EXAMPLE III

In order to further assess durability, the ability of a printed bar code to resist exposure to acetone was tested. The following protocol was used to evaluate the solvent resistance of printing on the cards.

A small amount of Acetone was poured into a glass beaker. A test substrate was provided with a barcode (code 128 or comparable) with ink or other printing material. The printed substrate was wiped with a clean, lint-free cloth. The edge contrast and readability of the bar code(s) was determined with a bar code scanner capable of determining edge contrast and code readability. The cotton portion of a cotton tipped, or equivalent swab was immersed into the solvent for 3 seconds or until it is saturated with the test solvent. With light to medium pressure, the saturated swab was wiped in one direction perpendicular to the lines of the bar code, across the center of the printed area of the substrate 20 times (20 "rub strokes"). The edge contrast and readability of the bar codes was determined after rubbing. If no degradation was apparent a cotton swab was again immersed in the acetone and the bar code wiped again as described above.

The following observations were made:

1. Loss of Edge contrast for each tested bar code.
2. Bar codes that could not be read after rubbing.
3. Presence of coloration on the cotton swab after rubbing the printed code.

Accordingly, in this Example, two cards each of card types 1, 2, and 3 were rubbed with a cotton ball containing acetone. ("rub stroke") After 100 rubs, Card type 1 retained its bar code and generated essentially the same edge contrast values. After the third rub stroke, Card Type 2 lost its printed bar code. The edge contrast values remained consistent until the bar code dissolved. After the first rub stroke, Card Type 3 lost all of the printed bar code.

In a preferred embodiment, the printed image on an item has the durability to resist more than 3, preferably more than 10, and most preferably more than 100 rub strokes of acetone.

The invention further provides a printed item in which the resolution of the item is relatively high, providing a high quality image appearance, i.e., wherein the resolution is greater than or equal to about 150 dots per inch (number of droplets per inch as measured across or perpendicular to the direction of travel of the substrate past the printing apparatus) and further in a more preferred embodiment is greater than or equal to about 180 dots per inch.

Although this detailed description sets forth particular embodiments according to the invention, various embodiments are contemplated to be within the scope of the invention set forth herein. Other materials may be used to provide a printed item including substrates laminates and/or inks. Various printers and methods of printing may be used to produce an item of the invention, including, for exampled those described in co-pending application entitled: PRINTER AND METHOD FOR PRINTING AN ITEM WITH A HIGH DURABILITY AND/OR RESOLUTION IMAGE, filed on even date herewith and incorporated herein by reference. Other printing processes may be used to provide a product of the invention. Furthermore, other items are contemplated for printing using the printing techniques and printer of the invention. Modifications to the printer and printing method may be made within the scope of the invention. Additionally various other cards and packages and items are contemplated to be created using the process of the invention described herein. While the invention is described with reference to plastic transaction cards, other items are contemplated according to the invention. In other embodiments, for example, other printed plastic items may be provided or items printed on other substrates or laminated substrates.

While the invention has been described with reference to particular embodiments, it will be understood to one skilled in the art that variations and modifications may be made in form and detail without departing from the spirit and scope of the invention. Such modifications may include substituting other elements, components or structures that the invention can be practiced with modification within the scope of the following claims.

What is claimed is:

1. A printed item comprising:

a surface; and an image printed on the surface of the item by a non-contact ink printing technique, wherein the image has a percent loss in edge contrast of less than or equal to about 50% after about 350 Taber cycles.

2. The printed item of claim 1 wherein the image has a resolution of at :Least about 150 dpi.

3. The printed item of claim 1 wherein the surface comprises a plastic.

4. A printed item comprising:

a surface; and an image printed on the surface of the item by a non-contact ink printing technique, wherein the image has a percent loss in edge contrast of less than or equal to about 10% after about 200 Taber cycles.

5. The printed item of claim 4 wherein the image has a percent loss in edge contrast of less than or equal to 10% after about 200 Taber cycles.

6. The printed item of claim 4 wherein the image has a resolution of at least about 150 dpi.

7. The printed item of claim 4 wherein the surface comprises a plastic.

8. A printed item comprising:

a surface; and an image printed on the surface of the item by a non-contact ink printing technique, wherein the image has a percent loss in edge contrast of less than or equal to about 5% after about 150 Taber cycles.

9. The printed item of claim 8 wherein the image has a resolution of at least about 150 dpi.

10. The printed item of claim 8 wherein the surface comprises a plastic.

11. A printed transaction card comprising:

a card having a planar surface; and an image printed or the surface of the item, wherein the image has a percent loss in edge contrast of less than or equal to about 10% after about 200 Taber cycles.

12. The printed transaction card of claim 11 wherein the image is a bar code.

13. The printed transaction card of claim 11 wherein the image is a PIN number.

14. The printed transaction card of claim 11 wherein the surface comprises a plastic.

15. The printed transaction card of claim 11 wherein the image has a resolution of at least about 150 dpi.

16. A plurality of individuated transaction cards wherein each card has two opposing planar sides, at least one of the planar sides having a image printed thereon allowing for matching of a transaction with the printed image thereon being unique to the transaction card upon which it resides so that it distinguishes the transaction card from the other of said plurality of transaction cards wherein the image has a percent loss in edge contrast of less than or equal to about 10% after about 200 Taber cycles.

17. A printed item comprising:

a surface; and an image deposited on the surface of the item, wherein the image has a percent loss in edge contrast of less than or equal to about 50% after about 350 Taber cycles.

18. The printed item of claim 17 wherein the image has a resolution of at least about 150 dpi.

19. A printed item comprising:

a surface; and an image deposited on the surface of the item, wherein the image has a percent loss in edge contrast of less than or equal to about 10% after about 200 Taber cycles.

20. The printed item of claim 19 wherein the image has a percent loss in edge contrast of less than or equal to 10% after about 200 Taber cycles.

21. The printed item of claim 19 wherein the image has a resolution of at least about 150 dpi.

* * * * *